United States Patent
Yasumoto

(10) Patent No.: US 8,559,878 B2
(45) Date of Patent: Oct. 15, 2013

(54) WIRELESS COMMUNICATION SYSTEM, WIRELESS COMMUNICATION APPARATUS, WIRELESS COMMUNICATION METHOD, AND NON-TRANSITORY COMPUTER READABLE RECORDING MEDIUM

(75) Inventor: Tomonori Yasumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1567 days.

(21) Appl. No.: 11/586,521

(22) Filed: Oct. 26, 2006

(65) Prior Publication Data

US 2008/0002624 A1    Jan. 3, 2008

(30) Foreign Application Priority Data

Jun. 30, 2006    (JP) .................................. 2006-181951

(51) Int. Cl.
*H04Q 7/20*    (2006.01)
*H04W 52/24*    (2009.01)

(52) U.S. Cl.
CPC ..................... *H04W 52/24* (2013.01)
USPC .......... 455/63.1; 455/436; 455/438; 455/450; 455/523; 455/509; 455/528; 455/455; 455/134; 455/135; 455/405; 370/254; 370/258; 370/351; 370/389; 370/274; 370/310; 370/338; 370/345; 370/252; 370/431

(58) Field of Classification Search
USPC ........ 455/436, 438, 455, 63.1, 450, 523, 561, 455/528, 509; 370/254–258, 351, 389–427, 370/431, 252, 345, 455, 338, 310
See application file for complete search history.

(56) References Cited

U.S. PATENT DOCUMENTS

| | | | | | |
|---|---|---|---|---|---|
| 5,461,627 | A | * | 10/1995 | Rypinski | 370/346 |
| 5,572,528 | A | * | 11/1996 | Shuen | 370/402 |
| 6,400,305 | B1 | * | 6/2002 | Kuhn | 342/20 |
| 7,222,175 | B2 | * | 5/2007 | Knauerhase et al. | 709/225 |
| 7,400,612 | B2 | * | 7/2008 | Yamaura | 370/338 |

(Continued)

FOREIGN PATENT DOCUMENTS

| | | | |
|---|---|---|---|
| EP | 1 248 477 A1 | 10/2002 | .............. H04Q 7/36 |
| EP | 1562333 A2 | 8/2005 | |

(Continued)

OTHER PUBLICATIONS

European Search Report based on European Patent Application No. 06122530.6 (dated May 28, 2009).

(Continued)

*Primary Examiner* — Fayyaz Alam
*Assistant Examiner* — Ganiyu A Hanidu
(74) *Attorney, Agent, or Firm* — Fujitsu Patent Center

(57) ABSTRACT

A term for interrupting communication caused by operation of a DFS function is reduced for a wireless communication apparatus having the DFS function and a wireless communication apparatus and a wireless communication system corresponding to the DFS function of the wireless communication apparatus. In the wireless communication apparatus and the wireless communication system having a frequency changing function for changing a using frequency upon detecting out-of-target electrical waves such as electrical waves of a weather radar on a specific using frequency, information about a connection destination having a different using frequency is notified upon detecting the out-of-target electrical waves, and the connection destination is changed by switching the frequency on the basis of the information about the connection destination.

19 Claims, 10 Drawing Sheets

(56) References Cited

U.S. PATENT DOCUMENTS

| | | |
|---|---|---|
| 2001/0021179 A1 | 9/2001 | Tiedemann, Jr. |
| 2003/0002456 A1* | 1/2003 | Soomro et al. ............... 370/328 |
| 2004/0043767 A1* | 3/2004 | Tsutsumi et al. .......... 455/432.1 |
| 2004/0156336 A1 | 8/2004 | McFarland |
| 2005/0032537 A1* | 2/2005 | Miyashita .................... 455/517 |
| 2005/0192016 A1* | 9/2005 | Zimmermann et al. ...... 455/450 |
| 2005/0206554 A1 | 9/2005 | Yamaura |
| 2005/0265286 A1 | 12/2005 | Umemura |
| 2006/0045034 A1* | 3/2006 | Kwon et al. .................. 370/310 |
| 2006/0120338 A1* | 6/2006 | Hwang et al. ................ 370/338 |
| 2007/0060057 A1* | 3/2007 | Matsuo et al. ............... 455/63.1 |
| 2008/0100494 A1 | 5/2008 | Yamaura |

FOREIGN PATENT DOCUMENTS

| | | | | |
|---|---|---|---|---|
| JP | 2004-535095 A | 11/2004 | ............ | H04J 11/00 |
| JP | 2005-223865 A | 8/2005 | | |
| JP | 2005-347887 A | 12/2005 | | |
| KR | 10200300 26817 A | 4/2003 | | |
| KR | 10200600 19306 A | 3/2006 | | |
| WO | WO 02/082844 A2 | 10/2002 | ............ | H04Q 7/36 |

OTHER PUBLICATIONS

Korean Office Action for Korean Patent Application No. 10-2009-31687 (dated May 29, 2009).

Korean Office Action dated Aug. 29, 2008 issued in corresponding Korean Patent Application No. 10-2008-60262 with English Translation.

Hyun-Ho Choi and Dong-Ho Cho, "Takeover: A New Vertical Handover Concept for Next-Generation Heterogeneous Networks"; Department of Electrical Engineering and Computer Science; Korea Advanced Institute of Science and Technology (KAIST), p. 1-5; Sep. 5, 2005 IEEE.

Korean Office Action dated Sep. 21, 2007, issued in corresponding Korean Patent Application No. 10.2006.0106487, 5-pps.

"Chinese Office Action", mailed Sep. 25, 2009 from CN Patent Office in corresponding CN Patent App. No. 200610146701.1. English-language translation provided.

Japanese Office Action mailed Jul. 19, 2011 for corresponding Japanese Application No. 2006-181951, with partial English-language translation.

* cited by examiner

WIRELESS COMMUNICATION SYSTEM, WIRELESS COMMUNICATION APPARATUS, WIRELESS COMMUNICATION METHOD, AND NON-TRANSITORY COMPUTER READABLE RECORDING MEDIUM

CROSS-REFERENCE TO RELATED APPLICATIONS

This application is based upon and claims the benefit of priority from the prior Japanese Patent Application No. 2006-181951, filed on Jun. 30, 2006, the entire contents of which are incorporated herein by reference.

BACKGROUND OF THE INVENTION

1. Field of the Invention

The present invention relates to control operation between communication apparatuses for communication between a wireless LAN (Local Area Network) access-point apparatus and a communication terminal apparatus. More particularly, the present invention relates to a wireless communication system and a wireless communication apparatus having a dynamic frequency selection (DFS) function, a wireless LAN system, a wireless LAN access-point apparatus, a wireless LAN terminal apparatus, a wireless communication method, and a computer readable recording medium recording a wireless communication program.

2. Description of the Related Art

A frequency band of 5 [GHz] (5.25 to 5.35 [GHz]) is used for a wireless LAN, as a wireless communication system, in conformity with IEEE (Institute of Electrical and Electronics Engineers) 802.11a. The frequency band is assigned to a weather radar, and electrical waves of the weather radar are received by a wireless LAN access point. The electrical waves of the weather radar are out-of-target electronic waves for the wireless LAN access point. At the wireless LAN access point, the electrical waves of the weather radar are detected, and the DFS function operates, thereby changing channels during the communication. With the DFS function, the channel is changed upon detecting the electrical waves of the weather radar and the interference against the electrical waves of the weather radar is prevented. In Japan, similarly to United States or Europe, using frequencies of the wireless LAN are assigned to the frequency band identical to that of the electrical waves of the weather radar. Therefore, the frequency change and channel change are required.

With respect to this DFS function, PCT Japanese Translation Patent Publication No. 2004-535095 discloses that a plurality of frequencies are monitored and estimated continuously or quasi-continuously and a quality parameter indicating the probability for sharing the frequency is assigned to each frequency in order to control the frequency selection (refer to summary, etc.).

Meanwhile, the DFS function operates and communication between connections, i.e., communication between a wireless LAN terminal apparatus and a wireless LAN access point is interrupted. Needless to say, a term for interrupting the communication damages reception and transmission of information. As a consequence, the reduction of the communication interruption term is required.

This problem is not disclosed in PCT Japanese Translation Patent Publication No. 2004-535095 and solution means thereof neither is suggested nor disclosed.

SUMMARY OF THE INVENTION

It is one object of the present invention to reduce a term for interrupting the communication that is caused by the operation of the DFS function in a wireless communication apparatus or a wireless communication system having a DFS function.

Further, it is another object of the present invention to reduce the term for interrupting the communication that is caused by the operation of the DFS function in a wireless communication apparatus corresponding to the wireless communication apparatus having the DFS function.

In order to accomplish the objects, according to the present invention, with respect to a wireless communication apparatus and a wireless communication system having a frequency changing function for changing a using frequency upon detecting out-of-target electrical waves such as a weather radar on a specific using frequency, communication about connection destinations having different using frequencies is notified upon detecting the out-of-target electrical waves such as the weather radar, and the connection destination is changed based on information about the connection destination by switching the frequency. With this structure, the connection destination is changed during the term for interrupting the communication caused by the frequency changing function and the communication is performed for a short time, thereby reducing the term for interrupting the communication.

In order to accomplish the objects, according to a first aspect of the present invention, there is provided a wireless communication system that changes a using frequency upon detecting out-of-target electrical waves on the using frequency, comprising: a first communication apparatus that sends, to a connection destination, a notification indicating information about the connection destination having a different using frequency upon detecting the out-of-target electrical waves; and a second communication apparatus that changes the connection destination on the basis of the information about the connection destination notified from the first communication apparatus that is being connected. With this structure, the change of the connection destination results in the change in frequency and the term for interrupting the communication is therefore reduced.

In order to accomplish the objects, in the wireless communication system, preferably, the first communication apparatus may comprise a search unit that searches another connection destination, and sends, to the second communication apparatus, the changed using frequency as the information about the connection destination on the basis of the search result of the search unit. This structure also accomplishes the objects.

In order to accomplish the objects, in the wireless communication system, preferably, the second communication apparatus may be connected to a communication apparatus except for the first communication apparatus or to the first communication apparatus by the changed using frequency, on the basis of the information about the connection destination. This structure also accomplishes the objects.

In order to accomplish the objects, in the wireless communication system, preferably, the first communication apparatus may comprise a connection destination changing function that changes the connection to the connection destination having a different using frequency, and be a wireless LAN access-point apparatus that sends a packet including the information about the connection destination upon detecting the out-of-target electrical waves on the using frequency. This structure also accomplishes the objects.

In order to accomplish the objects, in the wireless communication system, preferably, the second communication apparatus may be a wireless LAN terminal apparatus that receives a packet including the information about the connection destination and changes a wireless LAN access-point apparatus on the connection destination. This structure also accomplishes the objects.

In order to the objects, according to a second aspect of the present invention, there is provided a wireless communication apparatus that changes a connection destination upon detecting out-of-target electrical waves on a using frequency, comprising: a communication unit that sends, to the current connection destination, a notification indicating information about the connection destination including the connection destination having a different using frequency, on the basis of detection information about the out-of-target electrical waves. With this structure, the current connection destination receives the information about the connection destination, thereby switching the connection destination to a new one. Further, the term for interrupting the communication is reduced.

In order to accomplish the objects, in the wireless communication apparatus, preferably, the wireless communication apparatus may be a wireless LAN access-point apparatus having a sending unit that sends a packet including information about a wireless LAN access-point apparatus having a different using frequency on the connection destination to a wireless LAN terminal apparatus that is being connected on the basis of the detection information about the out-of-target electrical waves. This structure also accomplishes the objects.

In order to accomplish the objects, preferably, the wireless communication apparatus may further comprise a frequency changing unit that changes the using frequency; and a control unit that controls the communication unit to send the packet including the information about the connection destination having a different using frequency to the wireless communication apparatus that is being connected before the frequency changing unit changes the using frequency. This structure also accomplishes the objects.

In order to accomplish the objects, according to a third aspect of the present invention, there is provided a wireless communication apparatus connected to a connection destination having a frequency changing function that changes a using frequency upon detecting out-of-target electrical waves, comprising: a receiving unit that receives information about the connection destination having a different frequency, sent from the connection destination; and a connection switching unit that switches the connection destination on the basis of the information about the connection destination received by the receiving unit. With this structure, the information about the connection destination is received and the connection destination can be switched to a new one quickly. Further, the term for interrupting the communication is reduced.

In order to accomplish the objects, according to a forth aspect of the present invention, there is provided a wireless LAN system having a frequency changing function that changes a using frequency upon detecting out-of-target electrical waves on the using frequency, the wireless LAN system comprising: a wireless LAN access-point apparatus that sends a packet including information about a connection destination upon detecting the out-of-target electrical waves; and a wireless LAN terminal apparatus that receives the packet of a wireless LAN access-point apparatus that is being connected and changes the connection destination on the basis of the information about the connection destination in the packet. This structure also accomplishes the objects.

In order to accomplish the objects, according to a fifth aspect of the present invention, there is provided a wireless LAN system having a wireless LAN access-point apparatus having a frequency changing function that changes a using frequency, the wireless LAN system comprising: a wireless LAN terminal apparatus that sends a packet including information about out-of-target electrical waves to the wireless LAN access-point apparatus upon detecting the out-of-target electrical waves; and a wireless LAN access-point apparatus that receives the packet of the wireless LAN terminal apparatus and sends a packet including information about the connection destination having a different using frequency to the wireless LAN terminal apparatus. This structure also accomplishes the objects.

In order to accomplish the objects, according to a sixth aspect of the present invention, there is provided a wireless LAN access-point apparatus having a frequency changing function that changes a using frequency upon detecting out-of-target electrical waves, the wireless LAN access-point apparatus comprising: a sending unit that sends a packet including information about the wireless LAN access-point apparatus having a different using frequency on the connection destination to the wireless LAN terminal apparatus that is being connected on the basis of detection information about the out-of-target electrical waves. This structure also accomplishes the objects.

In order to accomplish the objects, preferably, the wireless LAN access-point apparatus may further comprise a frequency changing unit that changes the using frequency; and a control unit that controls the sending unit to send a packet including information about the wireless LAN access-point apparatus having a different using frequency on the connection destination to a wireless LAN terminal apparatus that is being connected before the frequency changing unit changes the using frequency. This structure also accomplishes the objects.

In order to accomplish the objects, according to a seventh aspect of the present invention, there is provided a wireless LAN terminal apparatus connected to a wireless LAN access-point apparatus having a frequency changing function that changes a using frequency upon detecting out-of-target electrical waves, the wireless LAN terminal apparatus comprising: a receiving unit that receives a packet including information about a wireless LAN access-point apparatus having a different using frequency on the connection destination, sent from the wireless LAN access-point apparatus; and a connection switching unit that switches connection to the wireless LAN access-point apparatus on the connection destination on the basis of the information included in the packet received by the receiving unit. This structure also accomplishes the objects.

In order to the objects, according to an eighth aspect of the present invention, there is provided a wireless communication method that changes a using frequency upon detecting out-of-target electrical waves, comprising the step of: sending a notification indicating information about a connection destination including a connection destination having a different using frequency to the current connection destination upon detecting the out-of-target electrical waves. This structure also accomplishes the objects.

In order to accomplish the objects, according to a ninth aspect of the present invention, there is provided a wireless communication method that changes a using frequency upon detecting out-of-target electrical waves, comprising the step of: changing connection to a connection destination included in information about the connection destination notified from the connection destination, on the basis of the information about the connection destination. This structure further accomplishes the objects.

In order to accomplish the objects, according to a tenth aspect of the present invention, there is provided a wireless communication method that changes a using frequency upon detecting out-of-target electrical waves, comprising the steps of: receiving information about a connection destination including a connection destination having a different using frequency by a packet from the current connection destination; and switching the connection destination on the basis of the information about the connection destination. This structure further accomplishes the objects.

In order to accomplish the objects, according to an eleventh aspect of the present invention, there is provided a computer readable recording medium recording a wireless communication program executable by a computer set to a wireless communication apparatus that can change a using frequency upon detecting out-of-target electrical waves, comprising the steps of: obtaining information about a connection destination; and storing the information about the connection destination to a storing unit. With this structure, the information about the connection destination of a new one is obtained before detecting the out-of-target electrical waves, the new connection destination can be notified to the wireless communication apparatus quickly upon detecting the out-of-target electrical waves, and the objects are accomplished.

In order to accomplish the objects, in the recording medium, preferably, the wireless communication program may further comprise the step of: searching the information about the connection destination to be notified to the connection destination on the basis of detection information about the out-of-target electrical waves. This structure also accomplishes the objects.

In order to accomplish the objects, according to a twelfth aspect of the present invention, there is provided a computer readable recording medium recording a wireless communication program executable by a computer set to a wireless communication apparatus having a changing function of a using frequency, comprising the step of: executing processing that changes a connection destination on the basis of information about a connection destination notified from the connection destination. This structure also accomplishes the objects.

According to the present invention, the connection destination is changed and reconnected on the basis of the information about the connection destination notified before changing the using frequency. Thus, the term for interrupting the communication is reduced.

Further, other objects, features, and advantages of the present invention will be obvious by referring to the attached drawings and embodiments.

DETAILED DESCRIPTION OF THE PREFERRED EMBODIMENTS

[First Embodiment]

Figure 1:
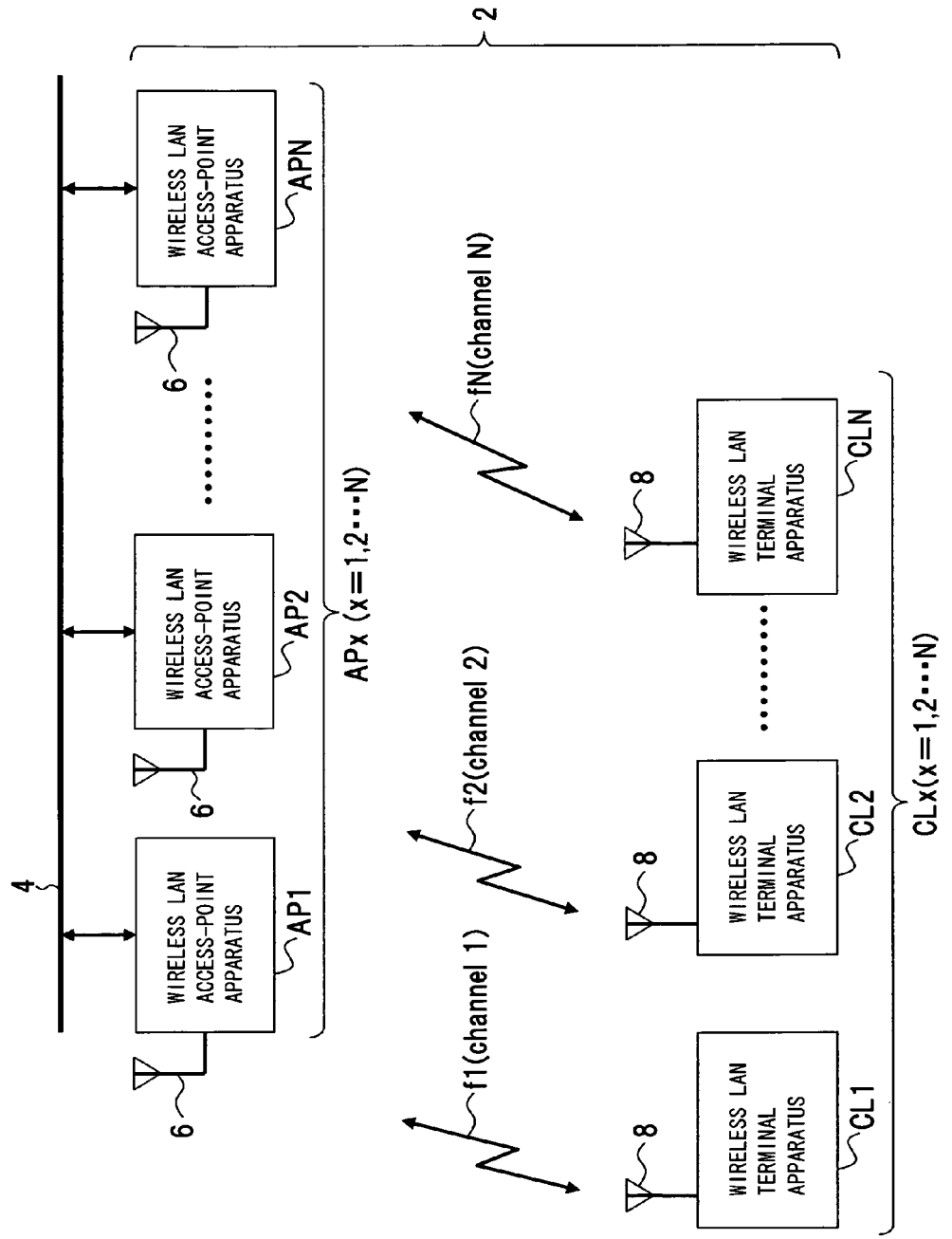
FIG. 1 is a diagram showing a wireless LAN system according to a first embodiment of the present invention.

A wireless communication system according to the present invention will be described with reference to FIG. 1. FIG. 1 is a diagram showing the wireless LAN system.

A wireless LAN system 2 is an example of a wireless communication system according to the present invention, and comprises a plurality of wireless LAN access-point apparatuses (hereinafter, simply referred to as an access point) APx having DFS functions, as first communication apparatuses, and a plurality of wireless LAN terminal apparatuses (hereinafter, simply referred to as "LAN terminals") CLx, as second communication apparatuses or clients of the access points APx.

Reference symbol x denotes 1, 2, . . . , N in the access point APx and the LAN terminal CLx. In this case, the access point APx includes access points AP1, AP2, . . . , APN and the LAN terminal CLx includes CL1, CL2, . . . , CLN. Further, the access points AP1, AP2, . . . , APN are connected via LAN cables, thereby constituting a single network 4.

The access point APx and the LAN terminal CLx use a frequency band of 5 [GHz], specifically, (5.25 to 5.35) [GHz]. A using frequency f is split into a plurality of channels (x) and using frequencies are varied depending on different channels (x). For example, the access point AP1 uses a channel 1, the access point AP2 uses a channel 2, . . . , and the access point APN uses a channel N. The LAN terminals CL1, CL2, . . . , CLN are connected to the access points AP1, AP2, . . . , and APN by wireless electrical waves of corresponding channel frequencies.

At the access points AP1, AP2, . . . , APN, reference symbol 6 denotes an antenna used for reception and transmission. Similarly, at the LAN terminals CL1, CL2, . . . , CLN, reference symbol 8 denotes an antenna used for reception and transmission, and reference symbols f1, f2, . . . , fN denote electrical waves of a single or different channels.

Connection destinations are specified to the access points AP1, AP2, . . . , APN. Further, access-point information (AP information) is stored to the access points AP1, AP2, . . . , APN as connection destination information including the using frequency (using channel). The AP information includes the followings.

(a) BSSID (Basic Service Set Identifier)
(b) channel

BSSID denotes an ID (Identification) of a wireless LAN interface of the access point AP, and channel denotes the using frequency of a switchable wireless LAN.

In the wireless LAN system 2, the access point AP1 detects electrical waves of a weather radar, i.e., out-of-target ones at the channel 1 of the using frequency 1. In this case, the DFS function operates, thereby shifting an operation to that for changing the using frequency. Before shifting, the above-mentioned AP information as the information about the connection destinations of different using frequencies is notified to the LAN terminal CL1. The LAN terminal CL1 receives the notification and further changes the connection destination on the basis of the notified AP information. If the notified AP information includes the access point AP2, the connection is switched to the access point AP2 as a new connection destination. In this case, if the using frequency of the access point AP2 is f2 (corresponding to the channel 2), the LAN terminal CL1 switches the using frequency to the using frequency f2.

Thus, a crosstalk to the out-of-target electrical waves can be prevented. Reconnection to the LAN terminal CL1 is possible for a time shorter than a term for interrupting the communication that is caused by waiting the operation end of a frequency changing function due to the DFS function of the access point AP1. The term for interrupting the communication of the LAN terminal CL1 can be reduced or be minimized. Further, the LAN terminal CL1 receives the information about the connection destination, thereby switching the connection destination quickly at the timing for receiving the information about the connection destination. When the out of target electrical waves correspond to electrical waves of the weather radar, the affection to the electrical waves of the weather radar can be prevented. In this case, the relationship between the access point AP1 and the LAN terminal CL1 has been described and other relationships between the access points AP2 to APN and the LAN terminals CL2 to CLN are similar thereto.

Figure 2:
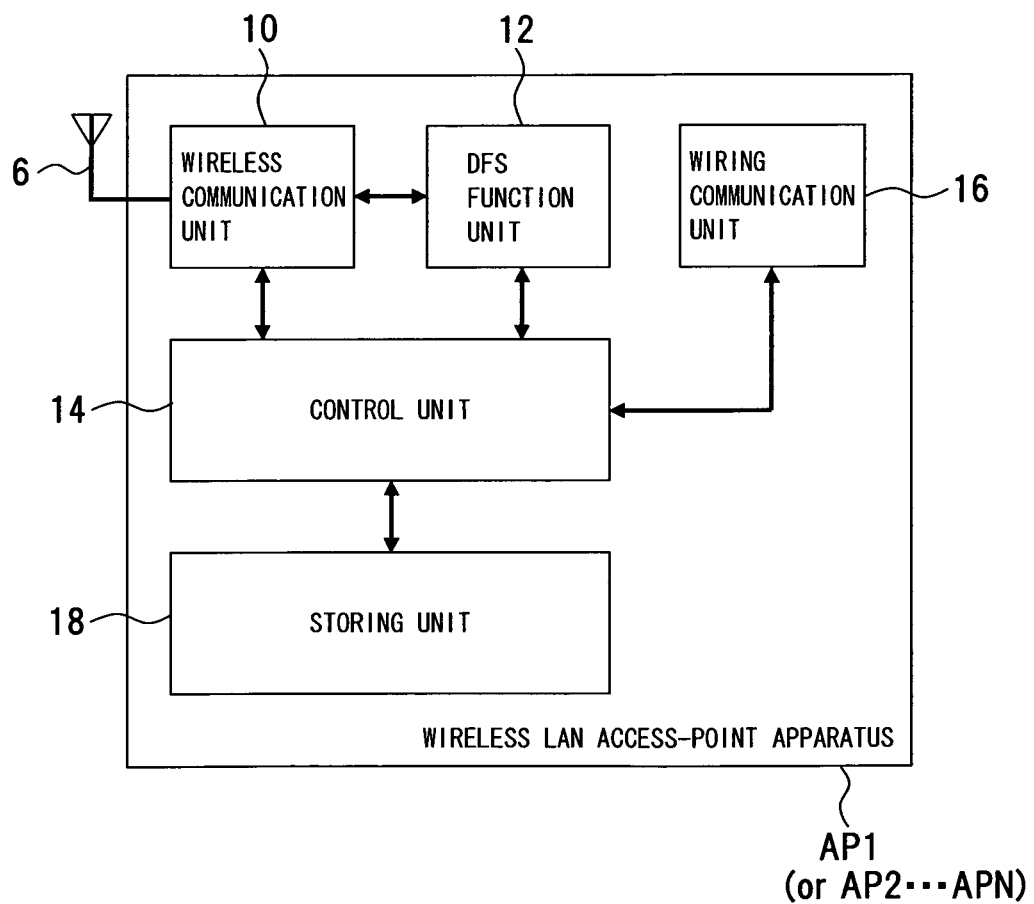
FIG. 2 is a diagram showing an example of a first communication apparatus.
Figure 3:
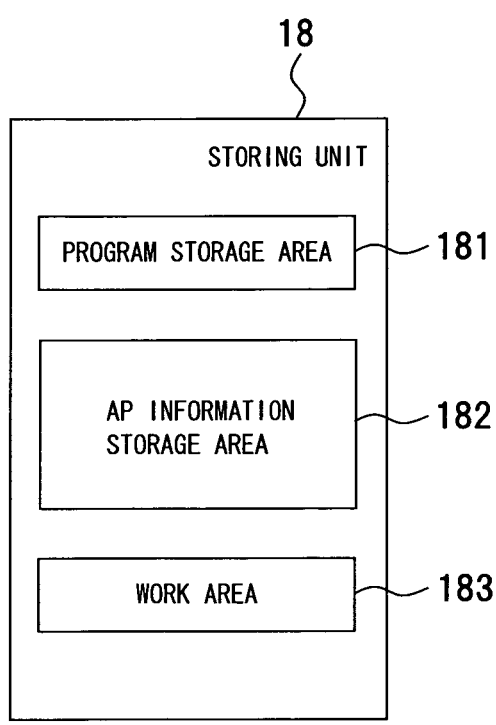
FIG. 3 is a diagram showing an example of the structure of a storing unit.
Figure 4:
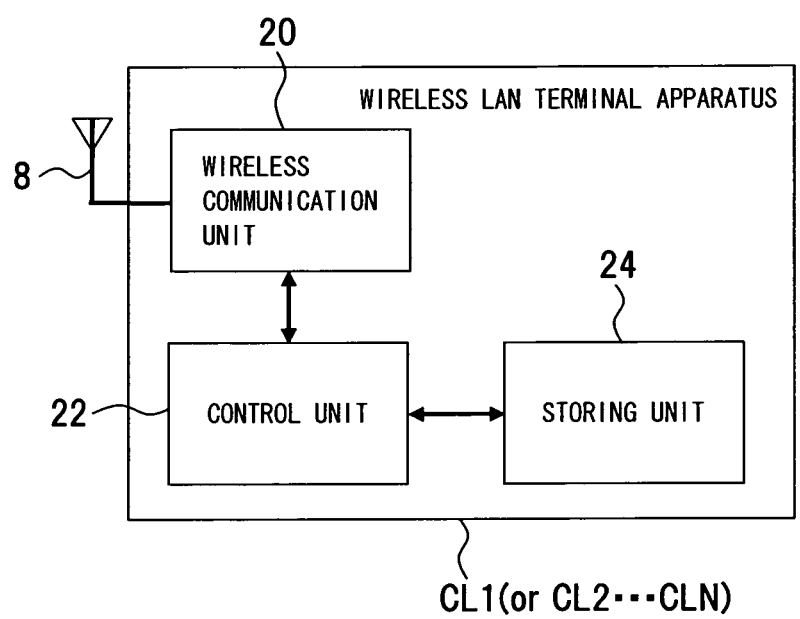
FIG. 4 is a diagram showing an example of a second communication apparatus.

Next, a description is given of a wireless communication apparatus and a wireless communication method according to the present invention with reference to FIGS. 2 to 4. FIG. 2 is a diagram showing an example of the first communication apparatus. FIG. 3 is a diagram showing an example of the structure of a storing unit. FIG. 4 is a diagram showing an example of the second communication apparatus. In FIGS. 2 to 4, The same reference symbols are added to the same reference portions as those in FIG. 1.

As described above, the access point AP1 is an example of the first communication apparatus. Referring to FIG. 2, according to the first embodiment, the access point AP1 comprises a wireless communication unit 10, a DFS function unit 12, a control unit 14, a wiring communication unit 16, and a storing unit 18. The wireless communication unit 10 comprises a sending unit that sends a using frequency of a wireless LAN via the antenna 6, and a receiving unit that receives the using frequency of the wireless LAN via the antenna 6. The DFS function unit 12 detects out-of-target electrical waves such as electrical waves of the weather radar from a reception signal from the receiving unit in the wireless communication unit 10, and changes the using frequency of the sending unit in the wireless communication unit 10 by changing the channel upon detecting the out-of-target electrical waves so as to prevent the crosstalk to the electrical waves of the weather radar. The wiring communication unit 16 comprises other access points AP2 to APN (refer to FIG. 1) and a transceiver unit that updates a network 4. The control unit 14 obtains the AP information, stores the AP information to the storing unit 18, searches the AP information, and performs various control operations including communication control of the wireless communication unit 10 serving as the function units, switching control of the frequency by using the DFS function unit 12, and the control of the wiring communication unit 16, by executing wireless communication programs in the storing unit 18. That is, the control unit 14 and the storing unit 18 form a search unit that searches the connection destination.

The storing unit 18 comprises a readable/writable recording medium that stores storage information, such as a flash ROM (Read-Only Memory) or an SDRAM (Synchronous Dynamic Random-Access Memory). Referring to FIG. 3, the storing unit 18 comprises a program storage area 181, an AP information storage area 182, a work area 183, etc. The program storage area 181 stores various control programs as well as these wireless communication programs, and the AP information storage area 182 stores the AP information in the same network 4. The work area 183 is a function area of a RAM (Random-Access Memory).

The structures shown in FIGS. 2 and 3 are identical to those at other access points AP2 to APN.

As mentioned above, the LAN terminal CL1 is an example of the second communication apparatus. Referring to FIG. 4, the first embodiment comprises a wireless communication unit 20, a control unit 22, and a storing unit 24. The wireless communication unit 20 comprises a sending unit that sends the using frequency of the wireless LAN via an antenna 8, and a receiving unit that receives the using frequency of the wireless LAN via the antenna 8. The control unit 22 comprises, e.g., a CPU (Central Processing Unit), and obtains the AP information, stores the AP information to the storing unit 24 and performs various control operations including communication control of the wireless communication unit 20 serving as the function units and switching control of the frequency and the connection destination, by executing wireless communication programs in the storing unit 24. That is, a connection-destination changing function unit is formed to change the access point APx on the connection destination by changing the using frequency with the control unit 22 and the wireless communication unit 20 at the roaming timing. The connection-destination changing function unit includes a function for reconnection to the previous access-point APx whose using frequency is changed.

The structure shown in FIG. 4 is identical to those of other LAN terminals CL2 to CLN.

An example of the wireless communication method will be described with reference to the structure. The wireless communication method comprises obtaining processing of the AP information and roaming processing using the DFS function. The roaming processing includes detecting processing of the out-of-target electrical waves, DFS processing, notifying processing of the AP information, and processing for changing the connection destination.

(1) Obtaining Processing of AP Information

The access point APx obtains information about the connection destination indicating a new connection destination upon detecting the out-of-target electrical waves. Specifically, the access point APx in the same network 4 is specified, and the AP information such as information indicating the using frequency is obtained via the wiring communication unit 16. The AP information is stored to the storing unit 18. The new connection destination at the roaming timing may be a nearby access point APx that can be roamed (that is, capable of wireless connection) checked in advance at the access point APx. In this case, if there is not another connection destination, the connection destination may be the connected self-access-point APx. Thus, the communication disconnection due to the frequency change can be prevented.

(2) Detecting Processing of Out-of-target Electrical Waves

During executing the communication, the out-of-target electrical waves as well as the using frequency are detected. For example, the communication with the LAN terminal CL1 is executed at the access point AP1. During the execution, the out-of-target electrical waves reach the access point AP1 and those are detected at the access point AP1. The out-of-target electrical waves include electrical waves except for the using electrical waves of the wireless LAN, and may include electrical waves of the weather radar, another wireless communication electrical waves, or unknown electrical waves such as noise.

(3) DFS Processing

The DFS processing is executed on the basis of the detection of the out-of-target electrical waves. As mentioned above, the DFS processing changes the using frequency. In this case, the DFS processing is executed on the basis of the detection of the out-of-target electrical waves after the notifying processing of the next AP information. If the previous using frequency is the frequency f1, the using frequency is changed to another frequency f2.

(4) Notifying Processing of AP Information

The notifying processing of the AP information is executed on the basis of the out-of-target electrical waves. Before the above-mentioned DFS processing, the AP information is searched from the storing unit 18, and the AP information, serving as the search result, is notified to the LAN terminal CL1 as the connection destination. In the processing, the AP information including the information about the connection destination such as another using frequency in a Deauth (De-authentication) packet is sent to the LAN terminal CLx on the connection destination.

(5) Processing for Changing the Connection Destination

The processing for changing the connection destination is executed at the timing for notifying the AP information. That is, the LAN terminal CLx that receives the notification of the AP information changes the connection destination from the access point APx that is being connected, and switches the access point APx to another connection destination.

In this case, if the connection destination does not exist, after the processing for changing the frequency of the access point AP1 that is being connected, the LAN terminal CLx is reconnected to the access point AP1.

This processing enables the reduction or minimization of the term for interrupting the communication on the LAN terminal CLx. The LAN terminal CLx receives the information about the connection destination. Thus, the connection destination can be quickly and smoothly switched at the timing for receiving the information about the connection destination. Further, if the out-of-target electrical waves are electrical waves of the weather radar, electrical waves of another wireless communication, or unknown electrical waves such as noise, the crosstalk to it can be prevented.

[Second Embodiment]

Figure 5:
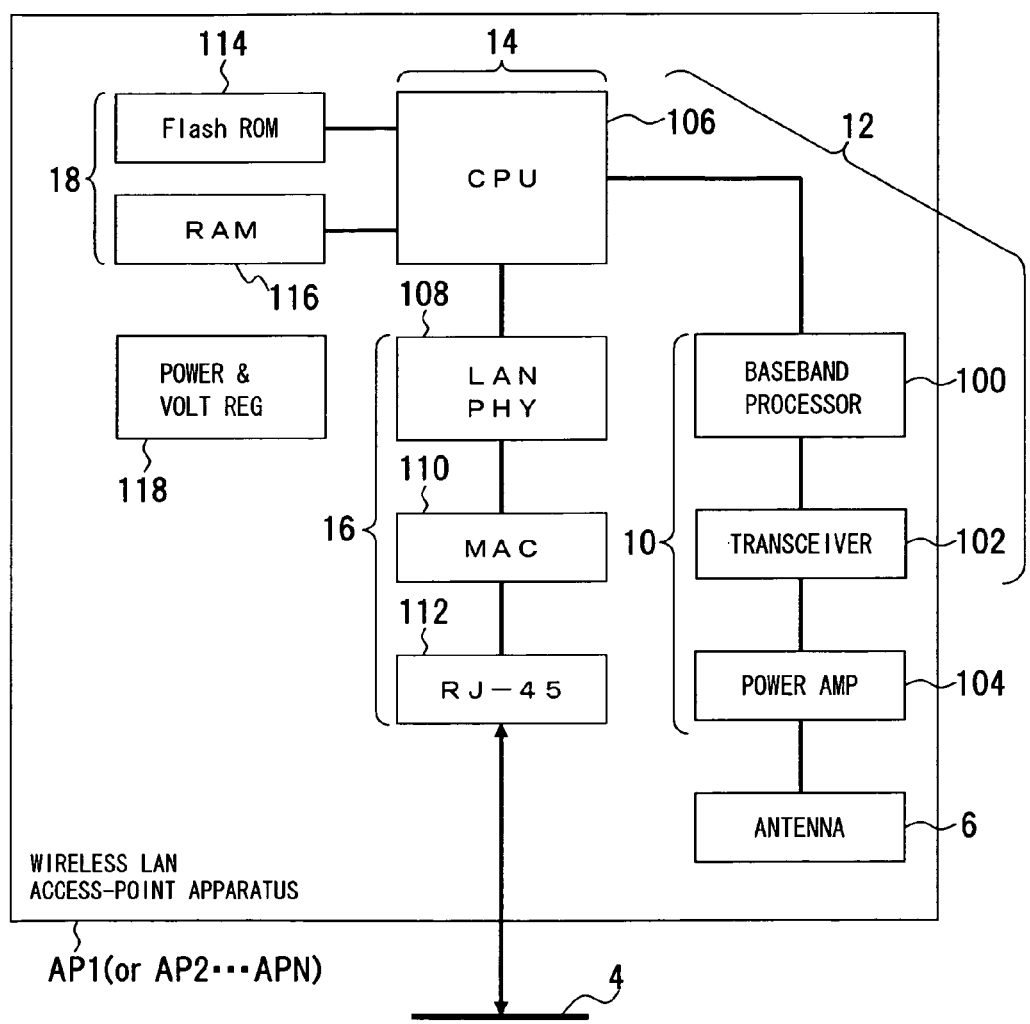
FIG. 5 is a diagram showing an example of the structure of a wireless LAN access-point apparatus according to a second embodiment of the present invention.

Next, a wireless communication apparatus according to the present invention will be described with reference to FIG. 5. FIG. 5 is a diagram showing an example of the structure of an access point according to the second embodiment of the present invention. In FIG. 5, the same reference symbols are added to the same portions as those in FIGS. 1 and 2.

An access point AP1 (or AP2, ..., APN) is used for the first communication apparatus in a wireless LAN system 2. At the access point AP1, the wireless communication unit 10 is a functional unit for wireless communication with LAN terminals CL1, CL2, ..., CLN, and comprises a baseband processing 100 as a communication control unit, a transceiver 102 as a wireless unit (RF), and a power amplifier unit (Power Amp) 104. Further, the wireless communication unit 10 is connected to an antenna 6. Furthermore, the wireless communication unit 10 is controlled by a CPU (central processing unit) 106 in a control unit 14, and modulates a data signal output via the baseband processor 100 by the transceiver 102. In addition, the power of the data signal is amplified by the power amplifier unit 104 and is sent as electrical waves from the antenna 6. The electrical waves received by the antenna 6 are demodulated by the transceiver 102. Thereafter, sending information is reproduced by the baseband processor 100. Alternatively, the out-of-target electrical waves including the electrical waves of the weather radar, noise, electrical waves of another wireless communication, and unknown electrical waves, except for the LAN electrical waves are detected. Based on the detection, the information about the new connection destination is notified from the wireless communication unit 10 to the LAN terminal CLx that is being connected in prior to the frequency change of the DFS function unit 12.

According to the second embodiment, the above-mentioned DFS function unit 12 (refer to FIG. 2) comprises the baseband processor 100, the transceiver 102, and the CPU 106 of the control unit 14. In this case, upon detecting the out-of-target electrical waves from the using frequency, the using frequency of the wireless communication unit 10 is changed.

The wiring communication unit 16 performs wiring communication on the basis of the connection to an external device such as a server device installed separately from the access point AP1 or to the network 4. The wiring communication unit 16 comprises, as components necessary for wiring communication, a LAN physical unit (LAN PHY) 108, an MAC (Medium Access Control) unit 110, and a LAN connector 112. In data reception and transmission between the CPU 106 and the external device, the LAN physical unit 108 sets a physical address, and the MAC unit 110 sets an MAC address. A predetermined-standard connector such as an RJ-45 connector is used for the LAN connector 112.

The storing unit 18 comprises a Flash ROM 114 and a RAM 116. The Flash ROM 114 corresponds to the program storage area 181 and the AP information storage area 182 (refer to FIG. 3), and stores control programs and the AP information. The RAM 116 corresponds to the work area 183 (refer to FIG. 3). The AP information stored in the storing unit 18 is read out by the CPU 116. Therefore, according to the second embodiment, the CPU 106 forms a search unit of the AP information.

The power supply unit 118 is a stable power supply, and feeds the stable output to various circuits of the CPU 106.

Figure 6:
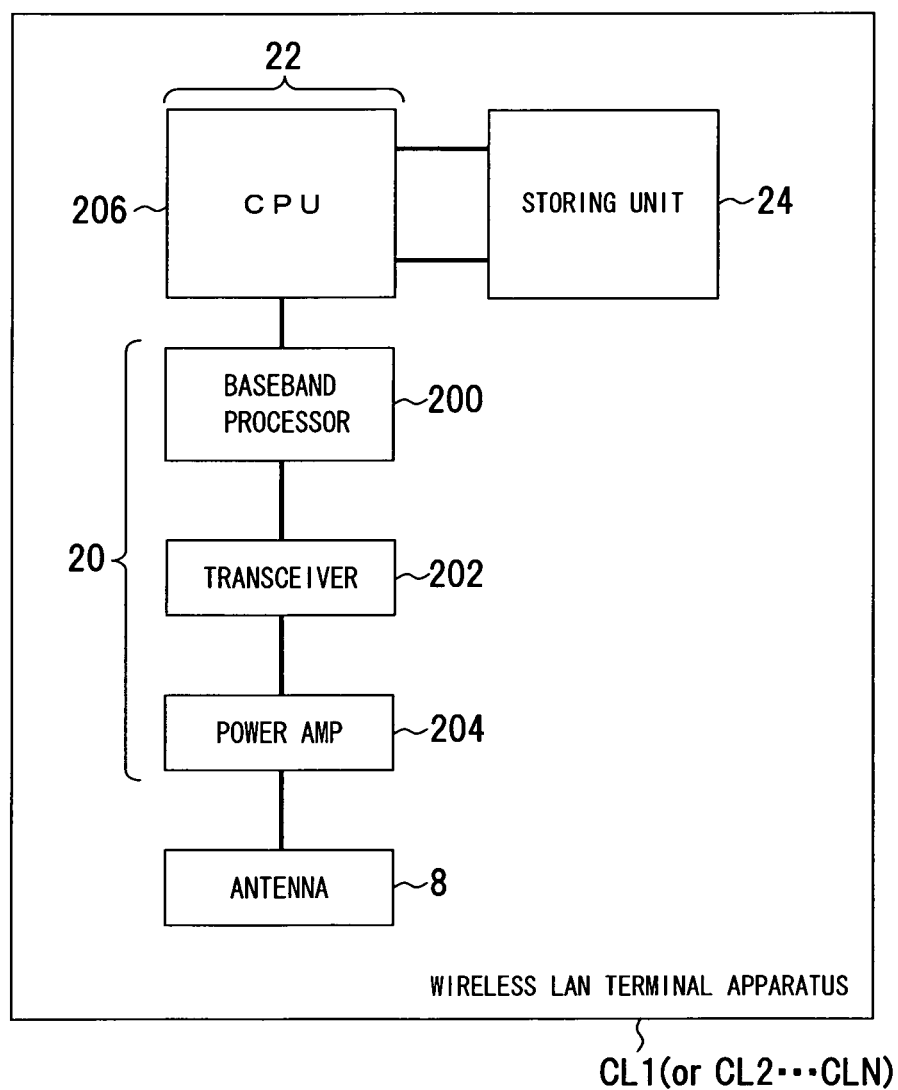
FIG. 6 is a diagram showing an example of the structure of a wireless LAN terminal apparatus according to the second embodiment.

The wireless communication apparatus according to the present invention will be described with reference to FIG. 6. FIG. 6 is a diagram showing an example of the structure of a LAN terminal according to the second embodiment. Referring to FIG. 6, the same symbols are added to the same portions as those in FIGS. 1 and 4.

In a wireless LAN system 2, the LAN terminal CL1 (or CL2, ..., CLN) is used for a second communication apparatus. In the LAN terminal CL1, a wireless communication unit 20 is a functional unit that performs wireless communication with access points AP1, AP2, ..., APN, comprises a baseband processor 200 as a communication control unit, a transceiver unit 202 as a wireless unit (RF), and a power amplifier (Power amp) unit 204, and is connected to the antenna 8. The wireless communication unit 20 is controlled by a CPU 206 so as to receive and send data to/from the connection destination. A data signal output via the baseband processor 200 is modulated via the transceiver 202, and the power of the data signal is amplified by the power amplifier 204. Thereafter, the amplified signal is sent as electrical waves from an antenna 8. The electrical waves received by the antenna 8 are demodulated by the transceiver 202, and are reproduced as reception information by the baseband processor 200.

When the access point AP1 as the current connection destination detects the out-of-target electrical waves such as the electrical waves of the weather radar, noise, other wireless communication electrical waves, and unknown electrical waves, except for the LAN electrical waves, the LAN terminal CL1 receives a notification of the AP information by a packet issued from the access point AP1, and changes the electrical waves to the using frequency presented by the AP information. The change of the frequency is changed by the wireless communication unit 20 and the control unit 22. Therefore, according to the second embodiment, the wireless communication unit 20 and the control unit 22 form a frequency changing functional unit. The frequency changing functional unit includes a function for reconnection to the access point AP1 that is being connected when the new the connection destination does not exist.

Figure 7:
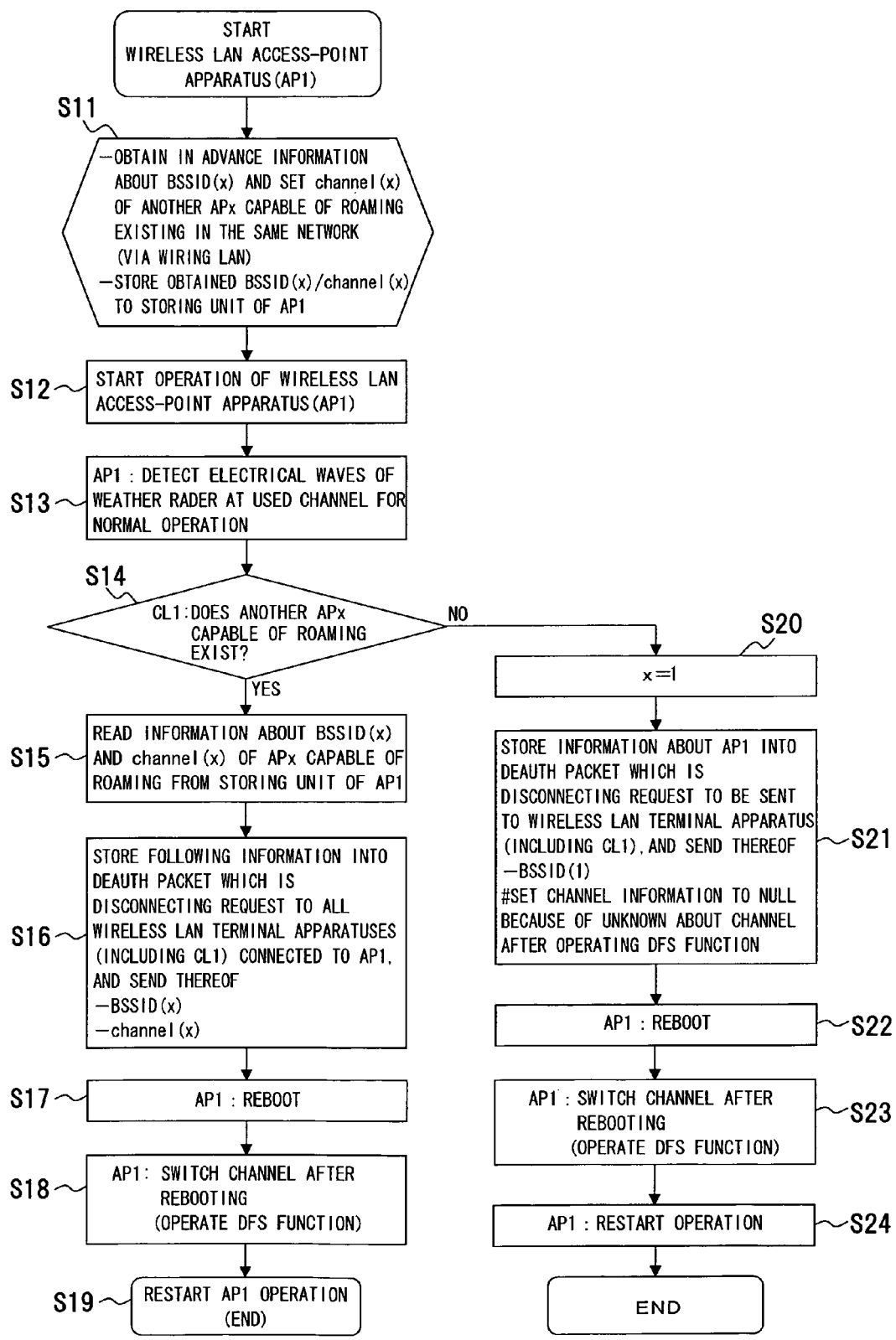
FIG. 7 is a flowchart showing a processing sequence of the wireless LAN access-point apparatus.

Next, a description is given of processing at the access point with reference to FIG. 7. FIG. 7 is a flowchart showing processing sequence of the access point.

According to the processing sequence, the access point AP1 is shown as an example. Further, the processing sequences of other access points AP2 to APN are similar to that of the access point AP1.

The processing sequence includes roaming processing upon operating the DFS function. Before detecting the out-of-target electrical waves such as the electrical waves of the weather radar in the used channel and interrupting the electrical waves with the DFS function, the access point AP1 sends a Deauth packet to the LAN terminal CL1 that is being connected, and allows the Deauth packet to include the information about the connection destination such as information about BSSID(x) and channel (x) of the access point APx that is to be newly connected. In this case, the new connection destination may be the nearby access point AP2 that can be roamed and is checked in advance by the access point AP1. Alternatively, the new connection destination may be the access point AP1. The LAN terminal CL1 that receives the Deauth packet executes processing for connection to the new the connection destination on the basis of the information about BSSID and channel.

At the access point AP1, the information about another access point APx capable of roaming and existing in the same network 4 is obtained. Upon executing the DFS function by detecting the electrical waves of the weather radar, processing for notifying the information to the LAN CL1 is executed.

The access point AP1 obtains in advance the information about BSSID(x) and channel (x) serving as the information about another access point APx capable of roaming via a wiring LAN (wiring communication unit 16), and stores the information about BSSID(x) and channel (x) to the storing unit 18 (step S11). Reference symbol x denotes 1 to N also in BSSID(x) and channel (x). As mentioned above, BSSID denotes ID for a wireless LAN interface of the access point, and BSSID (x) denotes BSSID at the access point APx. Further, channel (x) denotes a frequency channel of a wireless LAN at the access point APx.

After the setting, the access point AP1 starts the normal operation (step S12) and detects the electrical waves of the weather radar during the operation (step S13).

At the timing for detecting the electrical waves of the weather radar, it is determined whether or not the LAN terminal CL1 that is being connected includes the access point APx capable of roaming (step S14). If YES in step S14, the information about BSSID(x) and channel (x) of the access point APx capable of roaming is read from the storing unit 18 in the access point AP1 (step S15). A disconnecting request is issued to all LAN terminals CLx connected to the access point AP1 (step S16). The disconnecting request enables the Deauth packet indicating the disconnecting request to store the information about BSSID(x) and channel (x) indicating the target for resetting the identification and to send the packet to all LAN terminals CL1, CL2, . . . , CLN that are being connected to the access point AP1. Herein, the Deauth packet is a frame including code used for resetting the identification between wireless stations.

After the processing, the access point AP1 is rebooted (step S17). After the rebooting, the DFS function is operated and the channel is switched (step S18). The operation is restarted after changing the channel (step S19).

If the LAN terminal CL1 that is being connected does not include another access point APx capable of roaming (NO in step S14), the previous access-point AP1 is kept and x is set to 1 (step S20). In this case, the access point APx becomes AP1 and the information about the access point AP1 is stored in the Deauth packet indicating the disconnecting request and is sent to the LAN terminal (including CL1). Since the information about channel after operating the DFS function is unknown with respect to BSSID (1), null is set (step S21).

After the processing, the access point AP1 is rebooted (step S22). After the rebooting, the DFS function is operated and the channel is switched (step S23). After changing the channel, the operation is restarted (step S24). Thus, this processing ends.

Figure 8:
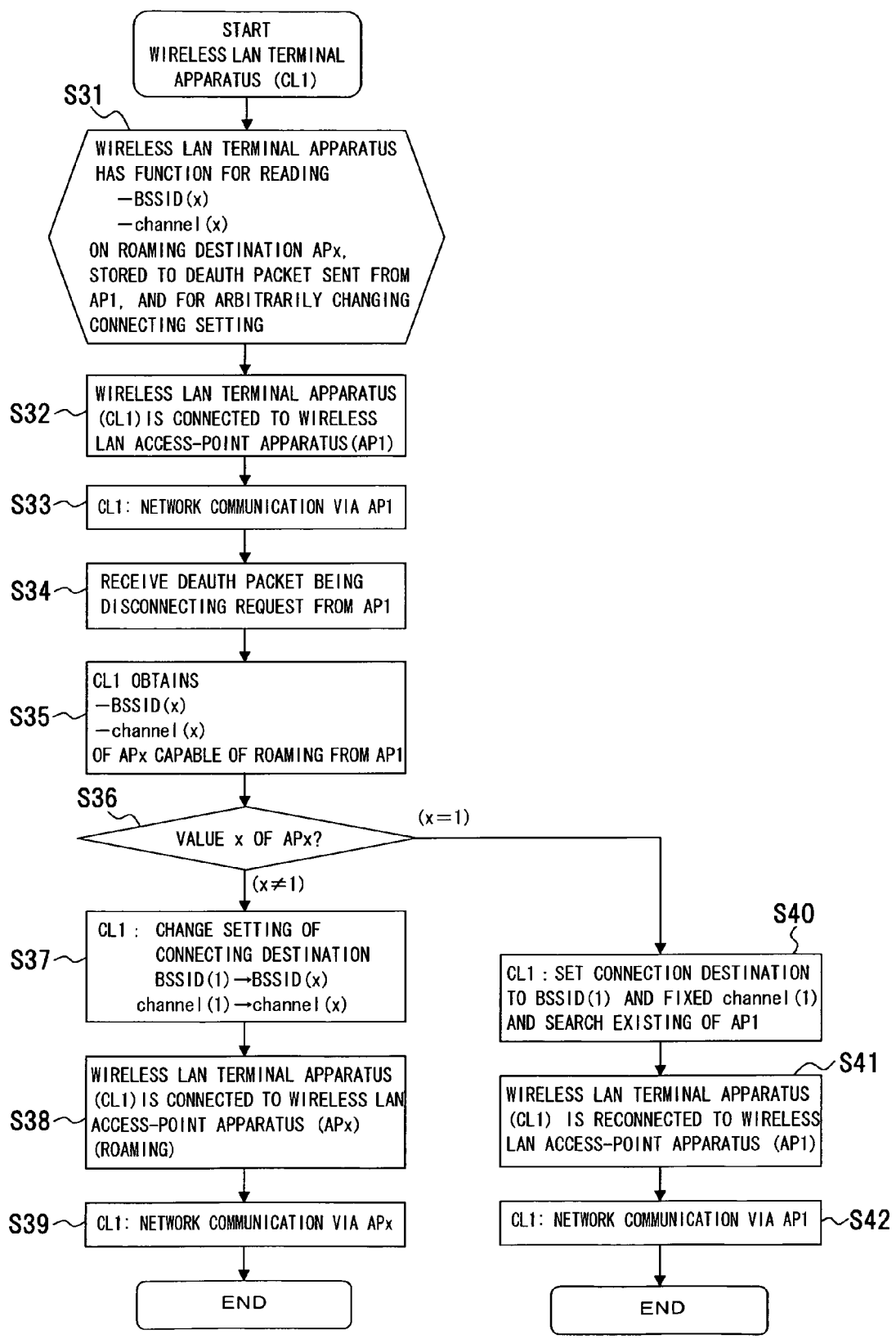
FIG. 8 is a flowchart showing a processing sequence of a wireless LAN terminal apparatus.

Next, processing on the LAN terminal will be described with reference to FIG. 8. FIG. 8 is a flowchart showing a processing sequence of the LAN terminal.

The LAN terminal CL1 has a function that reads the information about BSSID(x) and channel (x) on the roaming destination, stored in the Deauth packet sent from the access point AP1 and arbitrarily changes the connection destination.

The LAN terminal CL1 reads the information about BSSID(x) and channel (x) on the roaming destination from the Deauth packet sent from the access point AP1 (step S31). The LAN terminal CL1 is connected to the access point AP1 (step S32). The LAN terminal CL1 performs network communication via the access point AP1 (step S33).

The Deauth packet indicating the disconnecting request is received from the access point AP1 during the communication (step S34). The LAN terminal CL1 obtains the information about BSSID(x) and channel (x) of the access point APx capable of roaming of the LAN terminal CL1 from the access point AP1 (step S35).

With respect to the information BSSID(x) and channel (x) obtained by the LAN terminal CL1, the value x indicating the access point APx is determined (step S36). If the value x is not "1" (x≠1), the connecting setting of the LAN terminal CL1 is changed as follows (step S37).

BSSID(1)→BSSID(x)

channel (1)→channel (x)

The access point APx is designated on the basis of the information about BSSID(x) and channel (x). In this case, since x≠1, x=2, 3, . . . , N.

Thus, the LAN terminal CL1 is connected (roamed) to the access point APx (step S38). The network communication is executed via the access point APx (step S39). Thus, this processing ends.

If x is "1" (x=1) as a result of determining the value x specifying the access point APx with respect to the information about BSSID(x) and channel (x) obtained by the LAN terminal CL1, the connecting setting of the LAN terminal CL1 is BSSID(1) and fixed channel (1), and it is searched whether or not the access point AP1 exists (step S40).

Thus, the LAN terminal CL1 is reconnected to the access point AP1 (step S41). The network communication is executed via the access point AP1 (step S42). As a consequence, this processing ends.

Next, cooperation processing between the access point and the LAN terminal will be described with reference to FIG. 9.

Figure 9:
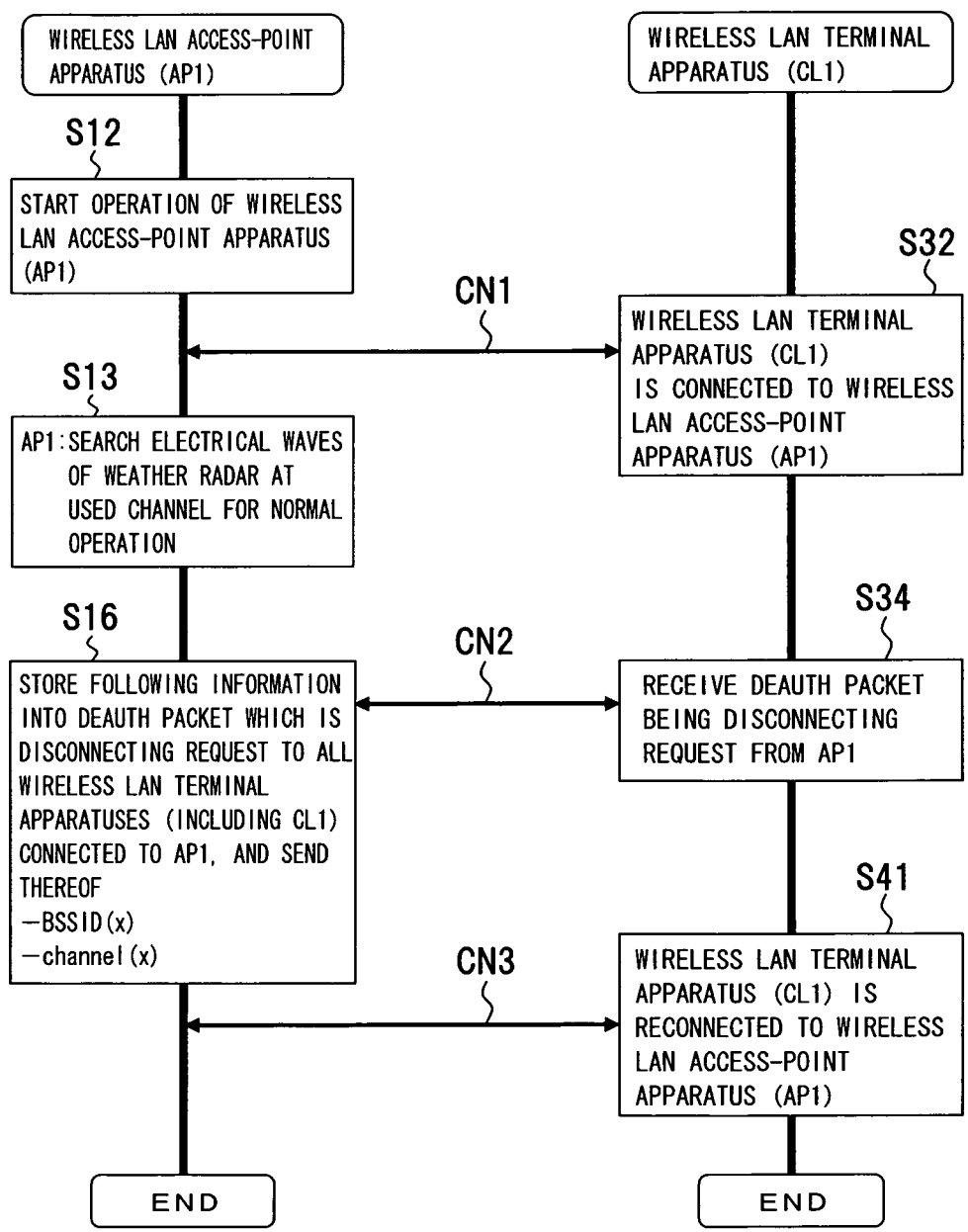
FIG. 9 is a diagram showing a processing sequence of cooperation processing between the wireless LAN access-point apparatus and the wireless LAN terminal apparatus.

FIG. 9 is a diagram showing a processing sequence of the cooperation between the access point AP1 and the LAN terminal CL1. In FIG. 9, the same reference symbols are added to the same steps as those in FIGS. 7 and 8.

With respect to the access point AP1 and the LAN terminal CL1, after starting the operation (step S12) of the access point AP1, the access point AP1 and the LAN terminal CL1 are connected (step S32). If the out-of-target electrical waves are detected at the access point AP1 (step S13), the Deauth packet is sent to the LAN terminal CL1 form the access point AP1 to the LAN terminal CL1 (step S16). The LAN terminal CL1 receives the Deauth packet (step S34).

The LAN terminal CL1 performs connecting processing of the new connection destination. If the connection destination does not exist, the reconnecting processing (step S41) is executed. Further, the LAN terminal CL1 is reconnected to the previous access-point AP1 whose using frequency is changed.

In the sequence, reference symbol CN1 denotes connecting processing, reference symbol CN2 denotes receiving and sending processing of the Deauth packet, and reference symbol CN3 denotes reconnecting processing.

As a result of this processing sequence, the LAN terminal CLx can obtain the information about the connection destination before the operation of the DFS function at the access point APx, and is connected to the new connection destination quickly and smoothly. Alternatively, the LAN terminal CLx can be reconnected to the previous connection destination. If the channel of the access point is changed with the DFS function, such an inconvenience that the communication interruption on the LAN terminal continues for a long time can be prevented and the crosstalk with the out-of-target electrical waves can be prevented.

[Third Embodiment]

Figure 10:
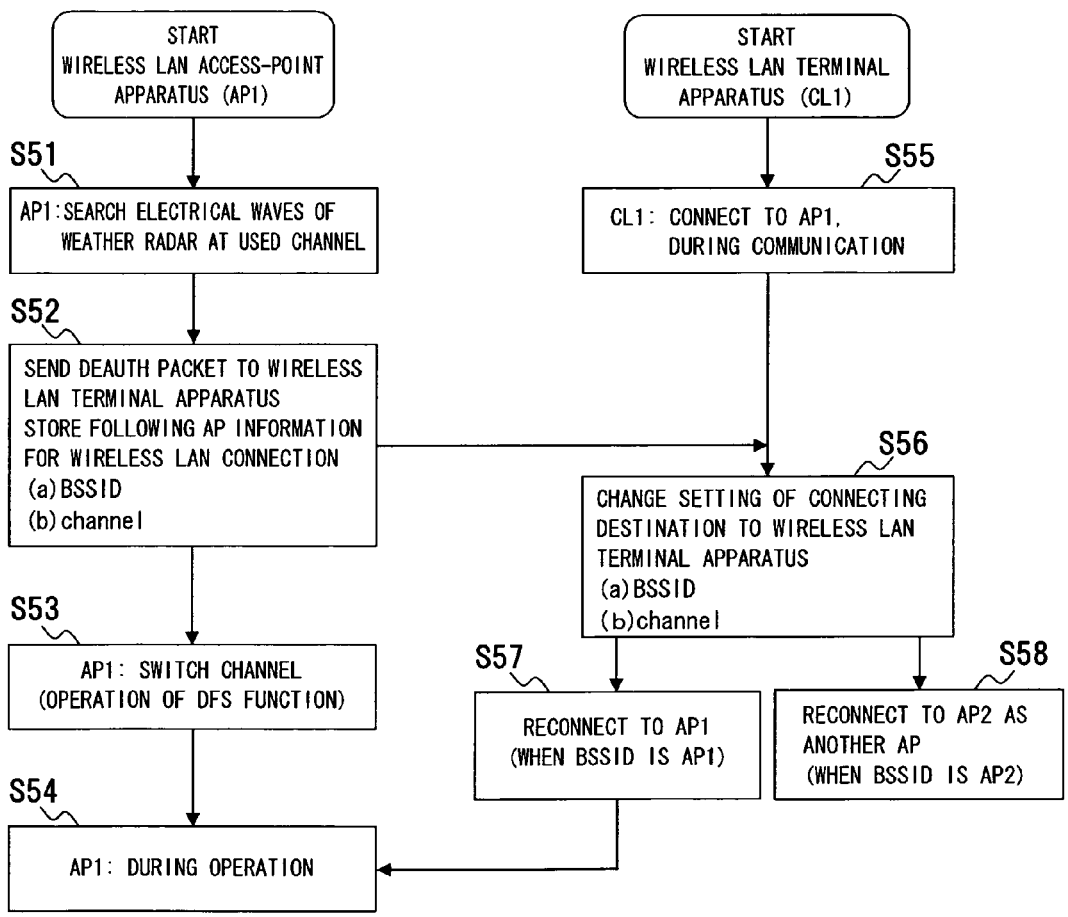
FIG. 10 is a flowchart showing processing sequences between a wireless LAN access-point apparatus and a wireless LAN terminal apparatus and cooperation processing therebetween according to a third embodiment of the present invention.

Next, a wireless communication method according to the present invention will be described with reference to FIG. 10. FIG. 10 is a flowchart showing processing sequences between the access points and the LAN terminals and cooperation processing therebetween according to the third embodiment.

These processing use the wireless LAN system 2 (refer to FIG. 1), the access point APx (refer to FIGS. 2 and 5), and the LAN terminal CLx (refer to FIGS. 4 and 6).

According to the third embodiment, the access point APx exists in the same network 4, obtains the information about another access point APx capable of roaming, and executes the processing for sending a notification indicating the information to the LAN terminal CLx when the DFS function is operated by detecting the electrical waves of the weather radars.

The access point AP1 detects the electrical waves of the weather radar at the channel that is being used (step S51).

At the timing for detecting the electrical waves of the weather radar, the Deauth packet is sent from the access point AP1 to the LAN terminal CL1 that is being connected (step S52). The Deauth packet stores the AP information for connection to the wireless LAN. The AP information includes the followings.

(a) BSSID
(b) channel

As mentioned above, reference symbol "BSSID" denotes an ID for a wireless LAN interface of the access point, and reference symbol "channel" denotes a frequency of a switchable wireless LAN.

At the access point AP1, the DFS function is operated and the channel is switched (step S53). After that, the access point AP1 is operated (step S54).

At the LAN terminal CL1, during connection and communication with the access point AP1 (step S55), the AP information is received from the access point AP1 and the identical or unidentical (a) BSSID and (b) channel are set by changing the setting of the connection destination (step S56).

When this setting is received and the received information is identical to the AP information of the access point AP1 (when BSSID is AP1), the LAN terminal CL1 is reconnected to the access point AP1 (step S57) and the processing shifts to step S54. On the other hand, when the received information is unidentical to the AP information of the access point AP1 and is identical to the AP information of another access point AP, the LAN terminal CL1 is reconnected to, e.g., the access point AP2 (when BSSID is AP2) (step S58).

These processing sequences can obtain the same advantages as those according to the first and second embodiments.

[Other Embodiments]

(1) The LAN terminal CLx can detect the out-of-target electrical waves such as the electrical waves of the weather radar, noise, other wireless communication electrical waves, and unknown electrical waves, except for the LAN electrical waves. Therefore, the access point APx may receive a notification from the LAN terminal CLx based on the detection of the out-of-target electrical waves by the LAN terminal CLx, may send the information about the connection destination to the LAN terminal CLx, and may thereafter execute the DFS function.

(2) According to the first to third embodiments, the first communication apparatus has the DFS function and the second communication apparatus is a client. Alternatively, the second communication apparatus may have the DFS function.

(3) According to the first to third embodiments, the access point APx may include the server function. Alternatively, a server may be connected to the access point APx.

As mentioned above, the preferred embodiments of the present invention have been described. However, the present invention is not limited to those and, obviously, the present invention can be modified and changed by the well-known person within the range of claims and specification of the present invention. Further, the modification and change may obviously be included in the range of the present invention.

According to the present invention, the information about the connection destination indicating the new connection destination is provided before the operation of the DFS function in the communication with the wireless communication apparatus having the DFS function. The reconnection can be executed for a time shorter than the term for interrupting the communication upon reconnection after changing the frequency with the DFS function, and the communication continuousness can be advantageously kept.

What is claimed is:

1. A wireless communication system that changes a using frequency upon detecting out-of-target electrical waves on the using frequency, the wireless communication system comprising:

a first communication apparatus that sends, to a connection destination, a disconnection request including an identifier of another communication apparatus that is different from the first communication apparatus, and frequency information that represents a frequency, which is used by said another communication apparatus and is different from a frequency used by the first communication apparatus, to notify, to the connection destination, the identifier of said another communication apparatus and the frequency information; and a second communication apparatus that receives the disconnection request from the first communication apparatus when the first communication apparatus has just been connected to the second communication apparatus, connects to said another communication apparatus by the frequency used by said another communication apparatus on the basis of the identifier of said another communication apparatus and the frequency information, and changes a connection destination.

2. The wireless communication system according to claim 1, wherein
the first communication apparatus includes a search unit that searches for said another communication apparatus, and sends, to the second communication apparatus, the identifier of said another communication apparatus and the frequency information on the basis of the search result of the search unit.

3. The wireless communication system according to claim 1 wherein
the first communication apparatus includes a connection destination changing function that changes a connection to said another communication apparatus, and is a wireless LAN access-point apparatus that sends a disconnection request packet including the identifier of said another communication apparatus and the frequency information upon detecting the out-of-target electrical waves on the using frequency.

4. The wireless communication system according to claim 1, wherein
the second communication apparatus is a wireless LAN terminal apparatus that receives a disconnection request packet including the identifier of said another communication apparatus and the frequency information, and changes a wireless LAN access-point apparatus as a connection destination.

5. A wireless communication apparatus that changes a connection destination upon detecting out-of-target electrical waves on a using frequency, the wireless communication apparatus comprising:
a communication unit that sends, to a connection destination, a disconnection request including an identifier of another wireless communication apparatus that is different from the wireless communication apparatus, and frequency information that represents a frequency, which is used by said another wireless communication apparatus and is different from a frequency used by the wireless communication apparatus, on the basis of detection information about the out-of-target electrical waves, and notifies, to the connection destination, the identifier of said another wireless communication apparatus and the frequency information in order to connect the connection destination to said another wireless communication apparatus by the frequency used by said another wireless communication apparatus.

6. The wireless communication apparatus according to claim 5, wherein
the wireless communication apparatus is a wireless LAN access-point apparatus including a sending unit that sends, to a wireless LAN terminal apparatus being connected to the wireless LAN access-point apparatus, a disconnection request packet including an identifier of another wireless LAN access-point apparatus, and frequency information that represents a frequency, which is used by said another wireless LAN access-point apparatus, on the basis of the detection information about the out-of-target electrical waves.

7. The wireless communication apparatus according to claim 5, further comprising:
a frequency changing unit that changes the using frequency; and
a control unit that controls the communication unit to send a packet including the disconnection request to the connection destination before the frequency changing unit changes the using frequency.

8. A wireless communication apparatus connected to a connection destination having a frequency changing function that changes a using frequency upon detecting out-of-target electrical waves, the wireless communication apparatus comprising:
a receiving unit that receives a disconnection request sent from the connection destination and including an identifier of another communication apparatus that is different from the connection destination, and frequency information that represents a frequency, which is used by said another communication apparatus and is different from a frequency used by the connection destination; and
a connection switching unit that switches a connection to said another communication apparatus by the frequency used by said another communication apparatus on the basis of the identifier of said another communication apparatus and the frequency information, which are received by the receiving unit.

9. A wireless LAN system having a frequency changing function that changes a using frequency upon detecting out-of-target electrical waves on the using frequency, the wireless LAN system comprising:
a wireless LAN access-point apparatus that sends a disconnection request packet including an identifier of a communication apparatus that is different from the wireless LAN access-point apparatus, and frequency information that represents a frequency, which is used by the communication apparatus and is different from a frequency used by the wireless LAN access-point apparatus, upon detecting the out-of-target electrical waves; and
a wireless LAN terminal apparatus that receives the disconnection request packet from the wireless LAN access-point apparatus when the wireless LAN access-point apparatus has just been connected to the wireless LAN terminal apparatus, connects to the communication apparatus by the frequency used by the communication apparatus on the basis of the identifier of the communication apparatus and the frequency information, and changes a connection destination.

10. A wireless LAN system having a wireless LAN access-point apparatus having a frequency changing function that changes a using frequency, the wireless LAN system comprising:
a wireless LAN terminal apparatus that sends a packet, being for notifying detection of out-of-target electrical waves, to the wireless LAN access-point apparatus upon detecting the out-of-target electrical waves; and
a wireless LAN access-point apparatus that receives the packet, being for notifying detection of out-of-target electrical waves from the wireless LAN terminal apparatus and sends, to the wireless LAN terminal apparatus, a disconnection request packet including apparatus information about an apparatus having a using frequency different from the wireless LAN access-point apparatus on the basis of notification of the detection of out-of-target electrical waves.

11. A wireless LAN access-point apparatus having a frequency changing function that changes a using frequency upon detecting out-of-target electrical waves, the wireless LAN access-point apparatus comprising:
- a sending unit that sends, to a wireless LAN terminal apparatus being connected to the wireless LAN access-point apparatus, a disconnection request packet including an identifier of another wireless LAN access-point apparatus that is different from the wireless LAN access-point apparatus, and frequency information that represents a frequency, which is used by said another wireless LAN access-point apparatus and is different from a frequency used by the wireless LAN access-point apparatus on the basis of detection information about the out-of-target electrical waves, in order to connect the wireless LAN terminal apparatus to said another wireless LAN access-point apparatus by the frequency used by said another wireless LAN access-point apparatus.

12. The wireless LAN access-point apparatus according to claim 11, further comprising:
- a frequency changing unit that changes the using frequency; and
- a control unit that controls the sending unit to send the disconnection request packet to the wireless LAN terminal apparatus before the frequency changing unit changes the using frequency.

13. A wireless LAN terminal apparatus connected to a wireless LAN access-point apparatus having a frequency changing function that changes a using frequency upon detecting out-of-target electrical waves, the wireless LAN terminal apparatus comprising:
- a receiving unit that receives a disconnection request packet sent from the wireless LAN access-point apparatus and including an identifier of another wireless LAN access-point apparatus that is different from the wireless LAN access-point apparatus, and frequency information that represents a frequency, which is used by said another wireless LAN access-point apparatus and is different from a frequency used by the wireless LAN access-point apparatus; and
- a connection switching unit that connects to said another wireless LAN access-point apparatus by the frequency used by said another wireless LAN access-point apparatus on the basis of the identifier of said another wireless LAN access-point apparatus and the frequency information, which are received by the receiving unit, and switches a connection to said another wireless LAN access-point apparatus.

14. A wireless communication method of a wireless communication apparatus, the wireless communication method being for changing a using frequency upon detecting out-of-target electrical waves, the wireless communication method comprising:
- sending, to a connection destination, a disconnection request including an identifier of another wireless communication apparatus that is different from the wireless communication apparatus, and frequency information that represents a frequency, which is used by said another wireless communication apparatus and is different from a frequency used by the wireless communication apparatus, to notify, to the connection destination, the identifier of said another wireless communication apparatus and frequency information upon detecting the out-of-target electrical waves, in order to connect the connection destination to said another wireless communication apparatus by the frequency used by said another wireless communication apparatus.

15. A wireless communication method for changing a using frequency upon detecting out-of-target electrical waves, the wireless communication method comprising:
- receiving a disconnection request that is notified by the connection destination and includes an identifier of a communication apparatus that is different from a connection destination, and frequency information that represents a frequency, which is used by the communication apparatus and is different from a frequency used by the connection destination, connecting to the communication apparatus by the frequency used by the communication apparatus on the basis of the identifier of the communication apparatus and the frequency information, and changing a connection to the communication apparatus.

16. A wireless communication method for changing a using frequency upon detecting out-of-target electrical waves, the wireless communication method comprising:
- receiving a disconnection request packet from a wireless LAN access-point apparatus, the disconnection request packet including an identifier of another wireless LAN access-point apparatus that is different from the wireless LAN access-point apparatus, and frequency information that represents a frequency, which is used by said another wireless LAN access-point apparatus and is different from a frequency used by the wireless LAN access-point apparatus; and
- switching a connection to said another wireless LAN access-point apparatus by the frequency used by said another wireless LAN access-point apparatus on the basis of the identifier of said another wireless LAN access-point and the frequency information.

17. A non-transitory computer readable recording medium having stored therein a program for causing a computer to execute a wireless communication process, the computer being set to a wireless communication apparatus that can change a using frequency upon detecting out-of-target electrical waves, the wireless communication process comprising:
- obtaining apparatus information about another wireless communication apparatus for a connection destination connected to the wireless communication apparatus to roam;
- storing the apparatus information to a storing unit; and
- determining whether the connection destination can be connected to said another wireless communication apparatus, and if the connection destination can be connected to said another wireless communication apparatus, searching the storing unit for the apparatus information upon detecting the out-of-target electrical waves.

18. A non-transitory computer readable recording medium having stored therein a program for causing a computer to execute a wireless communication process, the computer being set to a wireless communication apparatus having a changing function of a using frequency, the wireless communication process comprising:
- receiving a disconnection request that is notified by the disconnection destination and includes an identifier of another communication apparatus that is different from a connection destination, and frequency information that represents a frequency, which is used by said another communication apparatus and is different from a frequency used by the connection destination, and executing processing that changes a connection to said another communication apparatus by the frequency used by said another communication apparatus on the basis of the identifier of said another communication apparatus and the frequency information.

19. A wireless communication apparatus that changes a connection destination upon detecting out-of-target electrical waves on a using frequency, the wireless communication apparatus comprising:

a communication unit that obtains apparatus information about another wireless communication apparatus that is for an apparatus of the connection destination to roam in prior to detection of the out-of-target electrical waves, the communication unit sending a notification to the apparatus of the connection destination, the notification indicating the apparatus information on the basis of detection information about the out-of-target electrical waves; and a storing unit that stores the apparatus information, wherein apparatus information of another wireless communication apparatus which is capable of roaming to said another wireless communication apparatus is read out from the storing unit upon detecting the out-of-target electrical waves, and the read apparatus information is notified to the apparatus of the connection destination by the communication unit.

* * * * *